United States Patent
Padmanabhan

(10) Patent No.: US 10,652,193 B2
(45) Date of Patent: May 12, 2020

(54) MANAGING AND ACCESSING DATA STORAGE SYSTEMS

(71) Applicant: Western Digital Technologies, Inc., Irvine, CA (US)

(72) Inventor: Neeresh Padmanabhan, San Francisco, CA (US)

(73) Assignee: Western Digital Technologies, Inc., San Jose, CA (US)

(*) Notice: Subject to any disclaimer, the term of this patent is extended or adjusted under 35 U.S.C. 154(b) by 389 days.

(21) Appl. No.: 14/308,566

(22) Filed: Jun. 18, 2014

(65) Prior Publication Data
US 2015/0372962 A1 Dec. 24, 2015

(51) Int. Cl.
| G06F 15/16 | (2006.01) |
| H04N 7/16 | (2011.01) |
| H04L 12/58 | (2006.01) |
| H04L 29/08 | (2006.01) |

(52) U.S. Cl.
CPC .............. *H04L 51/28* (2013.01); *H04L 51/18* (2013.01); *H04L 67/1097* (2013.01)

(58) Field of Classification Search
CPC ...... H04L 51/28; H04L 51/18; H04L 67/1097
USPC ......................................................... 709/206
See application file for complete search history.

(56) References Cited

U.S. PATENT DOCUMENTS

| 6,499,054 | B1 | 12/2002 | Hesselink et al. |
| 6,732,158 | B1 | 5/2004 | Hesselink et al. |
| 7,120,692 | B2 | 10/2006 | Hesselink et al. |
| 7,454,443 | B2 | 11/2008 | Ram et al. |
| 7,467,187 | B2 | 12/2008 | Hesselink et al. |
| 7,546,353 | B2 | 6/2009 | Hesselink et al. |
| 7,587,467 | B2 | 9/2009 | Hesselink et al. |
| 7,600,036 | B2 | 10/2009 | Hesselink et al. |
| 7,788,404 | B2 | 8/2010 | Hesselink et al. |
| 7,917,628 | B2 | 3/2011 | Hesselink et al. |
| 7,934,251 | B2 | 4/2011 | Hesselink et al. |
| 8,004,791 | B2 | 8/2011 | Szeremeta et al. |
| 8,244,814 | B1* | 8/2012 | Brown ................. H04L 51/08 370/242 |
| 8,255,661 | B2 | 8/2012 | Karr et al. |
| 8,285,965 | B2 | 10/2012 | Karr et al. |
| 8,290,912 | B1 | 10/2012 | Searls et al. |
| 8,341,117 | B2 | 12/2012 | Ram et al. |
| 8,341,275 | B1 | 12/2012 | Hesselink et al. |
| 8,352,567 | B2 | 1/2013 | Hesselink et al. |
| 8,526,798 | B2 | 9/2013 | Hesselink |

(Continued)

OTHER PUBLICATIONS

International Search Report and Written Opinion dated Sep. 24, 2015 from related PCT Serial No. PCT/US2015/036077, 13 pages.

(Continued)

*Primary Examiner* — Kevin T Bates
*Assistant Examiner* — Golam Mahmud
(74) *Attorney, Agent, or Firm* — Chang & Hale LLP

(57) ABSTRACT

Systems and methods are disclosed for managing and/or accessing distributed data storage. A server computing device or network attached storage (NAS) device may include a message processing module to send and receive electronic-mail (email) messages. The message processing module is configured to cause the NAS device to perform NAS operations based on messages (e.g., email messages from users) and to send email messages with the results of the NAS operations to users.

21 Claims, 5 Drawing Sheets

(56) References Cited

U.S. PATENT DOCUMENTS

| | | | |
|---|---|---|---|
| 8,578,009 B1* | 11/2013 | Newstadt | H04L 61/1594 709/206 |
| 8,631,284 B2 | 1/2014 | Stevens | |
| 8,631,470 B2* | 1/2014 | Backa | G06F 16/1824 726/4 |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,972,508 B1* | 3/2015 | Brown | H04L 51/08 370/392 |
| 9,197,599 B1* | 11/2015 | Barry | G06F 11/0709 |
| 9,594,760 B1* | 3/2017 | Upadhye | G06F 16/113 |
| 2002/0019851 A1 | 2/2002 | Pollack | |
| 2002/0032741 A1 | 3/2002 | Hilt | |
| 2003/0221075 A1* | 11/2003 | Achiwa | G06F 11/1448 711/162 |
| 2005/0114711 A1* | 5/2005 | Hesselink | H04L 63/0209 726/4 |
| 2005/0144195 A1 | 6/2005 | Hesselink et al. | |
| 2005/0144200 A1 | 6/2005 | Hesselink et al. | |
| 2007/0179800 A1 | 8/2007 | Oesterling | |
| 2007/0179995 A1* | 8/2007 | Prahlad | G06F 16/24575 |
| 2008/0016168 A1* | 1/2008 | Noonan | G06Q 10/107 709/206 |
| 2008/0140668 A1* | 6/2008 | Corrion | G06F 11/1435 |
| 2008/0147836 A1* | 6/2008 | Littlefield | H04L 67/1097 709/223 |
| 2009/0064297 A1* | 3/2009 | Selgas | G06F 21/335 726/6 |
| 2009/0150404 A1 | 6/2009 | Lin | |
| 2009/0204984 A1* | 8/2009 | Nagai | G06F 21/6218 725/5 |
| 2009/0217356 A1* | 8/2009 | Scott | G06F 21/604 726/4 |
| 2009/0234845 A1* | 9/2009 | DeSantis | H04L 43/026 |
| 2009/0276501 A1* | 11/2009 | Saito | H04L 67/06 709/206 |
| 2009/0319736 A1* | 12/2009 | Otani | G06F 16/1827 711/162 |
| 2010/0293148 A1* | 11/2010 | Cesario | G06F 11/1451 707/652 |
| 2011/0072364 A1* | 3/2011 | Prahlad | G06F 17/30221 715/752 |
| 2011/0149720 A1* | 6/2011 | Phuah | H04L 41/0681 370/216 |
| 2012/0036041 A1 | 2/2012 | Hesselink | |
| 2012/0083296 A1* | 4/2012 | Zhou | H04W 4/12 455/466 |
| 2013/0024424 A1* | 1/2013 | Prahlad | G06F 3/0649 707/640 |
| 2013/0212401 A1 | 8/2013 | Lin | |
| 2013/0227116 A1* | 8/2013 | Radhakrishnan | H04L 41/0823 709/224 |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2013/0290598 A1* | 10/2013 | Fiske | G06F 3/0625 711/103 |
| 2013/0290618 A1* | 10/2013 | Werner | G06F 11/1044 711/103 |
| 2013/0318573 A1* | 11/2013 | Reunamaki | H04W 12/04 726/4 |
| 2013/0346612 A1 | 12/2013 | Backa | |
| 2014/0095439 A1 | 4/2014 | Ram | |
| 2014/0096199 A1* | 4/2014 | Dave | G06F 21/604 726/4 |
| 2014/0150037 A1 | 5/2014 | Cavgalar | |
| 2014/0169921 A1 | 6/2014 | Carey | |
| 2014/0173215 A1 | 6/2014 | Lin et al. | |
| 2014/0229695 A1* | 8/2014 | Dinkar | H04L 67/1004 711/162 |
| 2014/0237070 A1* | 8/2014 | Choi | H04L 67/1097 709/216 |
| 2014/0365569 A1* | 12/2014 | Vyrros | H04W 4/12 709/204 |
| 2015/0212902 A1* | 7/2015 | Horspool | G06F 16/13 707/654 |
| 2015/0372962 A1* | 12/2015 | Padmanabhan | H04L 51/28 709/206 |

OTHER PUBLICATIONS

European Search Report for PCT/US2015/036077 dated Mar. 8, 2018.

"User Manual for Autosend", Retrieved from the Internet: URL: https://www.web.archive.org/web/20140325123721/http://www.filesharingbyemail.com:80/manualeng.html.

* cited by examiner

MANAGING AND ACCESSING DATA STORAGE SYSTEMS

BACKGROUND

Distribution of data storage across one or more data storage devices can provide increased data security through data redundancy. Network-attached storage (NAS) devices provide access to data over computer networks.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Network-attached storage (NAS) drives/systems can provide file-level data storage over a computer network, wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Figure 1:
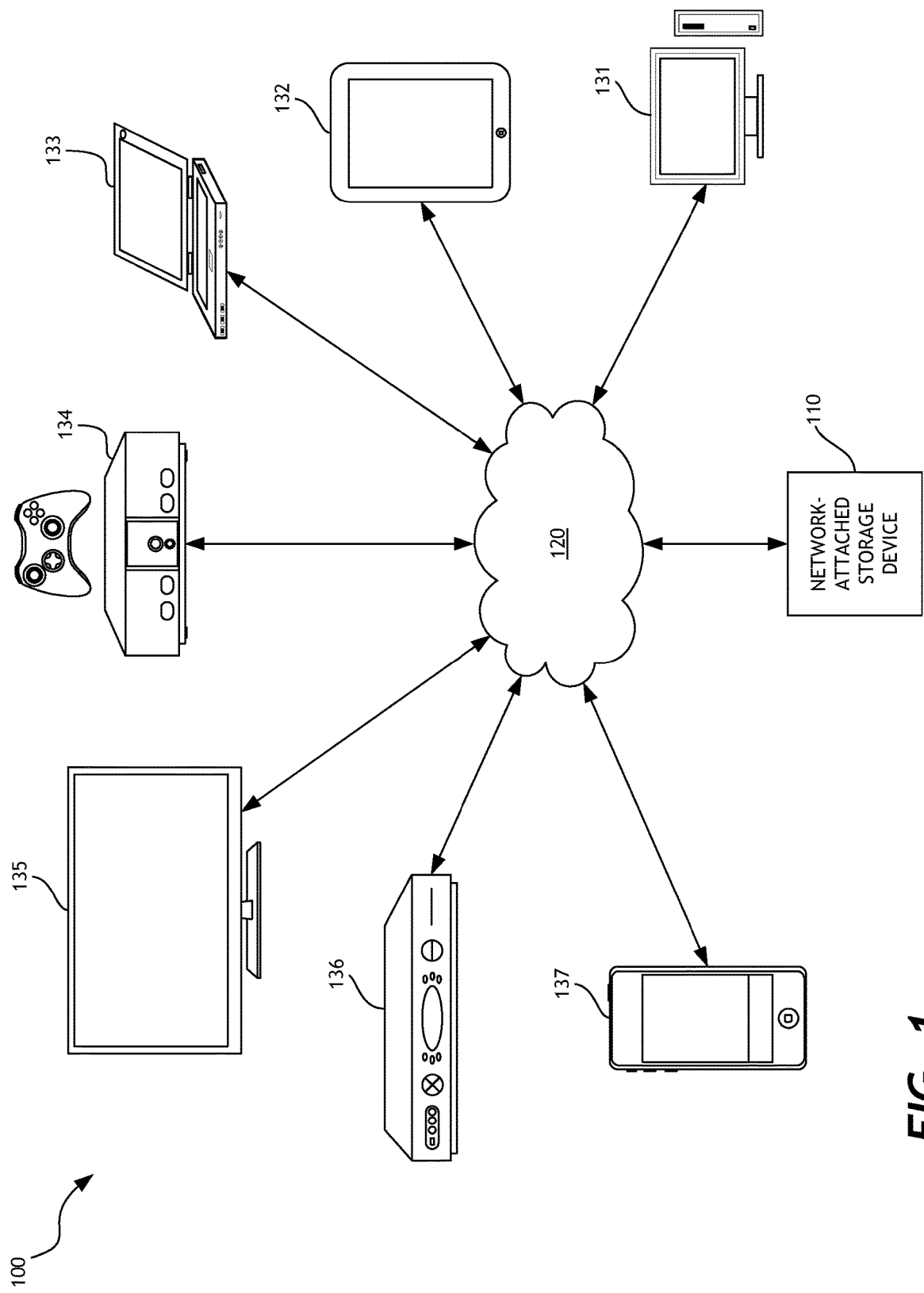
FIG. 1 is a diagram of a networked data storage system according to an embodiment.

FIG. 1 is a diagram illustrating an embodiment of a NAS system 100, in which a network-attached storage (NAS) device 110 is communicatively coupled to one or more client devices in order to provide file-based data storage services to other devices on the network 120. In one embodiment, network 120 may include a public network (e.g., the Internet), a private network (e.g., a local area network (LAN)), or wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer network, and/or a combination thereof. Types of client devices that may have access to the NAS device 110 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other network-connected computing devices.

The NAS device 110 device may provide various devices (e.g., phones 137, cable set-top boxes 136, smart TV's 135, video game consoles 134, laptop computers 133, tablet computers 132, desktop computers 131) with remote access to various types of user data stored on the NAS device 110. The NAS device 110 may also allow users to store various types of user data on the NAS device 110. The NAS device 110 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In certain embodiments, the NAS device 110 provides file-based services. Alternatively, the NAS device 110 may be configured to run software to provide additional server functionality. In certain embodiments, the NAS device 110 may be configurable over the network 120 by a client device interface, such as a web browser of a mobile or desktop computing device or software (e.g., an application) installed on the mobile or desktop computing device. For example, a low-level operating system may be implemented in the NAS, such as FreeNAS, which is an open source NAS solution designed for commodity PC hardware. The NAS device 110 may provide access to files using one or more network file-sharing protocols, such as NFS, SMB/CIFS, AFP, or the like.

Although NAS systems/devices can provide various benefits, as described above, in certain configurations, such systems may be associated with various issues and/or drawbacks. For example, NAS device may use proprietary or special software (e.g., applications) to access and/or manage the NAS device. Users may need to install the software on their computing devices (e.g., laptop computers, tablet computers, smartphones, desktop computers, etc.) in order to access and/or manage the NAS device. Furthermore, the software may not be integrated with a user's existing software environment (e.g., may not be integrated with other applications used by the user).

Certain embodiments disclosed herein provide the ability to access and/or manage NAS devices using electronic-mail (email) messages. A user communicate with the NAS device using email messages. The user may use the email messages to cause the NAS device to perform NAS operations (discussed in more detail below) and may receive the results of the NAS operations via email messages. The email messages may be addressed to a NAS email address (e.g., an email address associated with the NAS device) and/or may be received from the NAS email address.

Example Network-Attached Storage Systems

With further reference to FIG. 1, the NAS device 110 (e.g., magnetic disk drive, hybrid hard drive, solid-state drive, etc.) may include a controller (not shown) configured to receive data commands and to execute such commands in one or more non-volatile memory arrays of the NAS device 110. Such commands may include data read/write commands, and the like. The controller may be configured to receive data commands from a storage interface (e.g., a device driver) residing on a computing device. Data commands may specify a block address in the NAS device 110; data may be accessed/transferred based on such commands.

The NAS device 110 may be configured to store data in one or more magnetic recording disks and/or the solid state memory devices/arrays. In an embodiment, the NAS device 110 may comprise a cable box, a backup disk drive, a media storage unit, a streaming media device, a digital camera, or any other electronic device which may store data that may need to be accessed directly or wirelessly.

In certain embodiments, the NAS can store data received from a client device such that the NAS device 110 acts as data storage for the client device. To facilitate this function, the NAS device 110 can implement a logical interface. The logical interface can present to the client device memory as a set of logical addresses (e.g., sequential/contiguous addresses) where data can be stored. Internally, the NAS controller may map logical addresses to various physical memory addresses in the non-volatile memory of the NAS device 110. Mapping data indicating the mapping of logical addresses to physical memory addresses may be maintained in the NAS device 110.

In certain embodiments, the NAS device 110 is a single, centralized unit connected to a Wi-Fi router via, for example, an Ethernet cable. One or more of the clients (131-137) may share access to the NAS device 110 via a wide area network (WLAN), such as the Internet. In certain embodiments, data protection is achieved for the NAS device 110 using RAID (redundant array of inexpensive disks) technology, wherein multiple disk drive components are contained in the NAS for storing redundant data.

Accessing and/or Managing Network-Attached Storage Systems/Devices

Certain embodiments disclosed herein provide the ability to access and/or manage a NAS device using email messages. A user may use their existing email client to manage and/or access the NAS device using email messages. The user may use the email messages to cause the NAS device to perform NAS operations (discussed in more detail below) and may receive the results of the NAS operations via email messages. By using their existing email client (to send and/or receive emails), user may be able to manage and/or access the NAS device without installing additional software or using an additional interface (e.g., an additional web-based interface). The email messages may be addressed to a NAS email address (e.g., an email address associated with the NAS device) and/or may be received from the NAS email address. This may provide the user with the impression that they are communicating with a person as opposed to a NAS device. For example, it may be more natural for a user to send an email message requesting that the NAS device store a file (that is attached to the email message).

Figure 2:
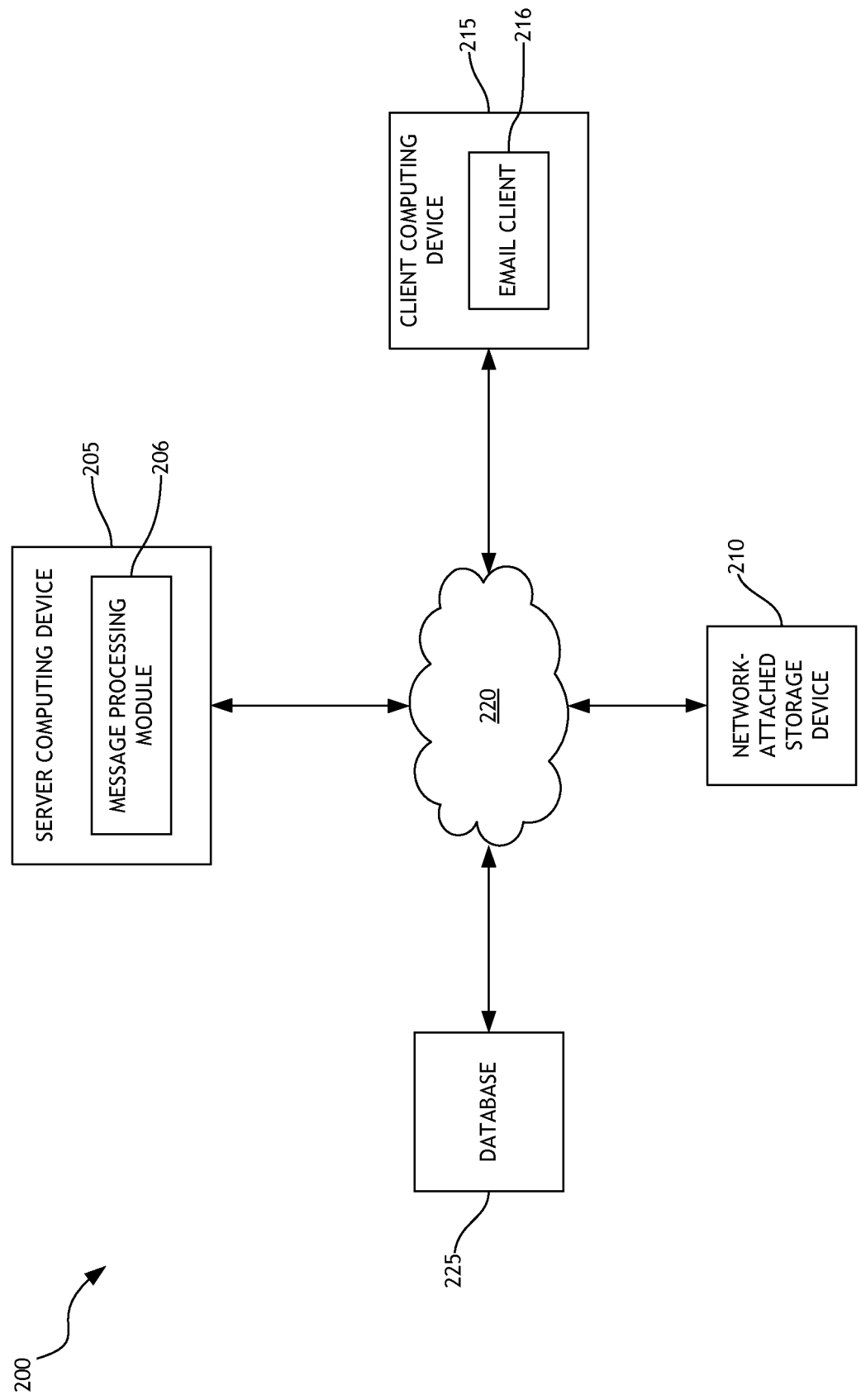
FIG. 2 is a diagram of a networked data storage system according to an embodiment.

FIG. 2 is a diagram of a networked data storage system 200 according to one or more embodiments. The networked data storage system 200 includes a server computing device 205, a client computing device 215, a NAS device 210, a database 225, and a network 220. The server computing device 205, client computing device 215, NAS device 210, and database 225 may be communicatively coupled to each other via the network 220. The network 220 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other type of computer network, and/or a combination thereof.

The client computing device 215 includes an electronic-mail (email) client 216. The email client 216 may be an application that allows a user of the client computing device 215 to read, write, modify, access, and/or manage email messages (e.g., emails). For example, the email client 216 may be a web browser that a user may use to access a web-based (e.g., internet based) email service. In another example, the email client 216 may be a separate or stand-alone application that may be dedicated to accessing and/or managing email messages.

The NAS device 210 device may provide other computing devices (e.g., tablet computers, smart phones, laptop computers, desktop computers, etc.) with access to various types of user data stored on the NAS device 210. The NAS device 210 may also allow users to store various types of user data on the NAS device 210. The NAS device 210 may comprise magnetic media, hard disk media, and/or solid-state media.

The NAS device 210 may perform various operations that may be related to the management of the NAS device 210 and/or accessing data (e.g., reading data, writing data, modifying data, etc.) on the NAS device 210. These operations may be referred to as NAS operations. In one embodiment, a NAS operation may be any operations, function, action, activity, act, etc., that may be performed by the NAS device 210. Examples of NAS operations include, but are not limited to, reading data, writing data, modifying data, moving data, obtaining usage statistics and/or the status of the NAS device 210 (as discussed later below), performing a diagnostic test, etc.

The server computing device 205 includes a message processing module 206. The message processing module 206 may allow users (e.g., end users, system administrators, technical support staff/personnel, etc.) to access and/or manage the NAS device 210 using email messages. The message processing module 206 may include a mail server (not shown in FIG. 2). The mail server may send, receive, route, forward, and/or process email messages from various users.

In one embodiment, the message processing module 206 may receive a request from a user to register and/or activate the NAS device 210. The message processing module 206 may request the user to provide an email address that may be associated with the NAS device 210. For example, the message processing module 206 may prompt the user to provide an email address (e.g., johnsmith_nas@email.com). In another example, the message processing module 206 may generate the email address (e.g., generate an email address based on the user's name and a serial number of the NAS device 210). The email address that is associated with the NAS device 210 may be referred to as a NAS email address. The NAS email address may also identify the NAS device 210. For example, the NAS email address "johnsmith_nas@email.com" may indicate that the NAS device 210 belongs to and/or is used by a user name John Smith. The message processing module 206 may store data indicative of the association between the NAS email address and the NAS device 210 on the database 225. For example, the message processing module 206 may store a serial number (or some other identifier) for the NAS device 210 and the NAS email address associated with the NAS device 210 in a table in the database 225.

In one embodiment, the message processing module 206 may send a notification email message to an email address associated with the user. For example, the message processing module 206 may generate an email message that includes the NAS email address as the sender email address (e.g., the email address that identifies the sender of the email message) and includes the user's email address as the recipient email address (e.g., the email address that identifies the recipient of the email message). The notification email message may include a list NAS operations that the user may request the NAS device 210 to perform using email messages. For example, the notification email message may indicate that the user can store files on the NAS device 210 using email messages or that the user can update the firmware on the NAS device 210 using email messages.

In another embodiment, a user may request the NAS device 210 to perform one or more NAS operations using an email message. The message processing module 206 may receive an email message from the user requesting the one or more NAS operations. The email address may include the NAS email address as the recipient email address. The message processing module 206 may determine which NAS operations are requested based on the email message (e.g., based on the subject or body/text of the email message) and may cause the NAS device 210 to perform the one or more NAS operations. The message processing module 206 may receive data indicative of the result of the one or more NAS operations and may generate and/or send a second email message with data indicative of the results to the user that requested the one or more NAS operations.

For example, the user may request the NAS device 210 to perform a NAS operation to store one or more files (e.g., images, movies, documents, etc.) on the NAS device 210 using the email client 216. The user may generate (e.g., draft) an email message using the email client 216 and may attach the one or more files to the email message. The email message (with one or more attached files) may include the NAS email address as the recipient email address. When the message processing module 206 receives the email message, the message processing module 206 may analyze the recipient email address and may determine that the recipient email address is the NAS email address associated with the NAS device 210. The message processing module 206 may analyze the subject and/or body (e.g., the text) of the email message and may determine that email message indicates that the wishes to store the one or more files attached to the email message on the NAS device 210. The message processing module 206 may provide the one or more files to the NAS device 210 so that the NAS device 210 may store the one or more files. The message processing module 206 may optionally scan the one or more files to prevent malicious data from being stored on the NAS device 210 (e.g., may perform a scan for viruses, malware, Trojan horses, etc.). In one embodiment, the message processing module 206 may also determine one or more storage locations for the one or more files. For example, the subject and/or body of the email message may indicate one or more storage locations for the one or more files (e.g., body of email message may include the text "\johnsmith\presentations" indicating a directory path). The message processing module 206 may also send another email message to the sender email address indicating whether the one or more files were successfully stored on the NAS device 210 (e.g., send a message with the result of the NAS operation).

In one embodiment, the message processing module 206 may determine whether a user associated with the sender email address (e.g., the sender of the email message) has permission to request the NAS device 210 to perform the one or more NAS operations. For example, the message processing module 206 may access the database 225 to determine whether the user associated with the sender email address is allowed to request the NAS device 210 to perform the NAS operation. If the user is not allowed to request the NAS device 210 to perform the NAS operation, the message processing module 206 may optionally send a second email message to an administrator of the NAS device 210 indicating that the user has requested the NAS device 210 to perform the NAS operation. The administrator may respond to the second email message indicating that the user should be allowed to request the NAS operation. The message processing module 206 may receive the administrator's response (e.g., email message) and may cause the NAS device 210 to perform the NAS operation (e.g., may transmit a message to the NAS device 210 instructing the NAS device 210 to perform the NAS operation). The message processing module 206 may also update the database 225 with data indicating that the user has permission to perform the NAS operation. If the user is allowed to request the NAS device 210 to perform the NAS operation, the message processing module 206 may cause the NAS device 210 to perform the NAS operation.

In another embodiment, the message processing module 206 may determine that the NAS device 210 should perform one or more NAS operations (e.g., may receive a message from a user or another computing device indicating that the one or more NAS operations should be performed or may determine that the one or more NAS operations should be performed on a scheduled, periodic, and/or sporadic basis). The message processing module 206 may send a message to the NAS device 210 instructing the NAS device to perform the one or more NAS operations. The NAS device 210 may perform the one or more NAS operations and may transmit a second message to the message processing module 206 with data indicative of the results of the one or more NAS operations.

For example, the message processing module 206 may determine that the NAS device 210 should perform a NAS operation to obtain the usage statistics and/or status of the NAS device 210. Examples of usage statistics may include, but are not limited to, data indicative of features of the NAS device 210 that are used by various users of the NAS device 210 (e.g., a checkpoint feature, a periodic backup feature, etc.), data indicative of streaming media usage of the NAS device 210 (e.g., what types of media are streamed, how often media is streamed, times when media is streamed, etc.), and data indicative of data usage (e.g., amount of storage space used on the NAS device 210, file sizes of files stored on the NAS device 210, how often files are accessed, which users are accessing which files on the NAS device 210, etc.). Examples of the status of the NAS device 210 may include data indicative of an amount of time that the NAS device 210 has been operating, data indicative of whether there are any errors with any components or modules (e.g., hardware and/or software) of the NAS device 210, versions of software and/or firmware on the NAS device 210, etc. The message processing module 206 may transmit a message to the NAS device 210 indicating that the NAS device 210 should obtain the usage statics and/or status of the NAS device 210 and transmit data indicative of the results to the message processing module 206. The NAS device 210 may send another message to the message processing module 206 with data indicative of the one or more usage statistics and/or the status of the NAS device 210 (e.g., may send another message with the result of the NAS operation).

In one embodiment, the message processing module 206 may identify one or more NAS operations that the NAS device 210 should perform. The message processing module 206 may generate and/or send an email message to a user (e.g., an administrator) indicating the one or more NAS operations. Based on a response email message from the user, the message processing module 206 may cause the NAS device to perform the one or more NAS operations. The NAS device 210 may provide the results of the one or more NAS operations to the message processing module 206 (e.g., transmit a message to the message processing module 206) and the message processing module 206 may also send another email message to the user with the results of the one or more NAS operations.

For example, based on a query of status of the NAS device 210, the message processing module 206 may determine that a new version of the firmware on the NAS device is available. The message processing module 206 may send an email message to an email address of an administrator for the NAS device 210 (e.g., a user) indicating that a newer firmware version is available. The email message may include the NAS email address as the sender email address. The administrator may respond to the email message to indicate whether the NAS device 210 should be updated with the new firmware version. If the response email message indicates that NAS device 210 should be updated with the new firmware version, the message processing module 206 may transmit a message to the NAS device 210 to cause the NAS device 210 to perform a NAS operation to update the firmware. The NAS device 210 may send a message to the message processing module 206 to indicate that the firmware on the NAS device 210 was updated. The message processing module 206 may also send a second email message to the email address of an administrator for the NAS device 210 indicating that the firmware of the NAS device 210 was updated.

In another embodiment, the message processing module 206 may generate and/or send an email message that includes a list of one or more features that may be that may be of interest to a user of the NAS device 210. For example, based on a query of usage statistics of the NAS device 210, the message processing module 206 may identify a feature (e.g., a checkpoint feature that allows the user to restore the NAS device 210 to specific state) that may be of interest to the user of the NAS device 210. The message processing module 206 may generate and/or send an email message that includes the identified feature (e.g., in body of the email message). The email message may include the NAS email address as the sender email address and an email address associated with the user of the NAS device 210 as the recipient email address.

In other embodiments, the NAS device 210 may perform various other NAS operations based on a message from the message processing module 206 instructing the NAS device 210 to perform the NAS operations. For example, the NAS device 210 may perform a diagnostic test of the NAS device 210 (based on a request from technical support staff/personnel) to determine whether modules and/or components of the NAS device 210 are functioning properly. In another example, the NAS device 210 may backup data on the NAS device 210 to another storage device (e.g., another hard disk) that may be communicatively coupled to the NAS device 210. The NAS device 210 may also backup data on the NAS device 210 to a data storage service. For example, the NAS device may backup data on the NAS device 210 to an Internet-based (e.g., cloud based) storage location. A data storage service may be a service (or a provider) that provides data storage and/or access to data from various locations. As discussed above, the message processing module 206 may also instruct the NAS device 210 to perform the NAS operations based on scheduled, periodic, and/or sporadic basis. The message processing module 206 may further instruct the NAS device 210 to perform the NAS operations based on email messages received from users of the NAS device 210 requesting the NAS operations.

In one embodiment, the message processing module 206 may receive a message indicating that the users should no longer be able to manage and/or access the NAS device 210 using email messages. For example, an administrator may send an email message (or other type of message) to the NAS email address indicating that the NAS device 210 can no longer be managed and/or accessed using email messages. The message processing module 206 may receive the email message and may identify the NAS device 210 based on the NAS email address. The message processing module 206 may disable access and/or management of the NAS device 210 using email messages (e.g., may no longer cause the NAS device 210 to perform the NAS operations) based on the email message received from the administrator.

In another embodiment, the message processing module 206 may also allow a user to view email messages sent to and/or received by the message processing module 206. For example, the message processing module 206 may allow an administrator to view all email messages received from other uses instructing the NAS device 210 to perform NAS operations. The message processing module 206 may also allow the administrator to view all email messages sent to users of the NAS device 210 (e.g., email messages indicating that results of NAS operations or indicating that firmware updates are available). The message processing module 206 may provide a web-based user interface that may allow the administrator to view email messages sent to and/or received by the message processing module 206.

Figure 3:
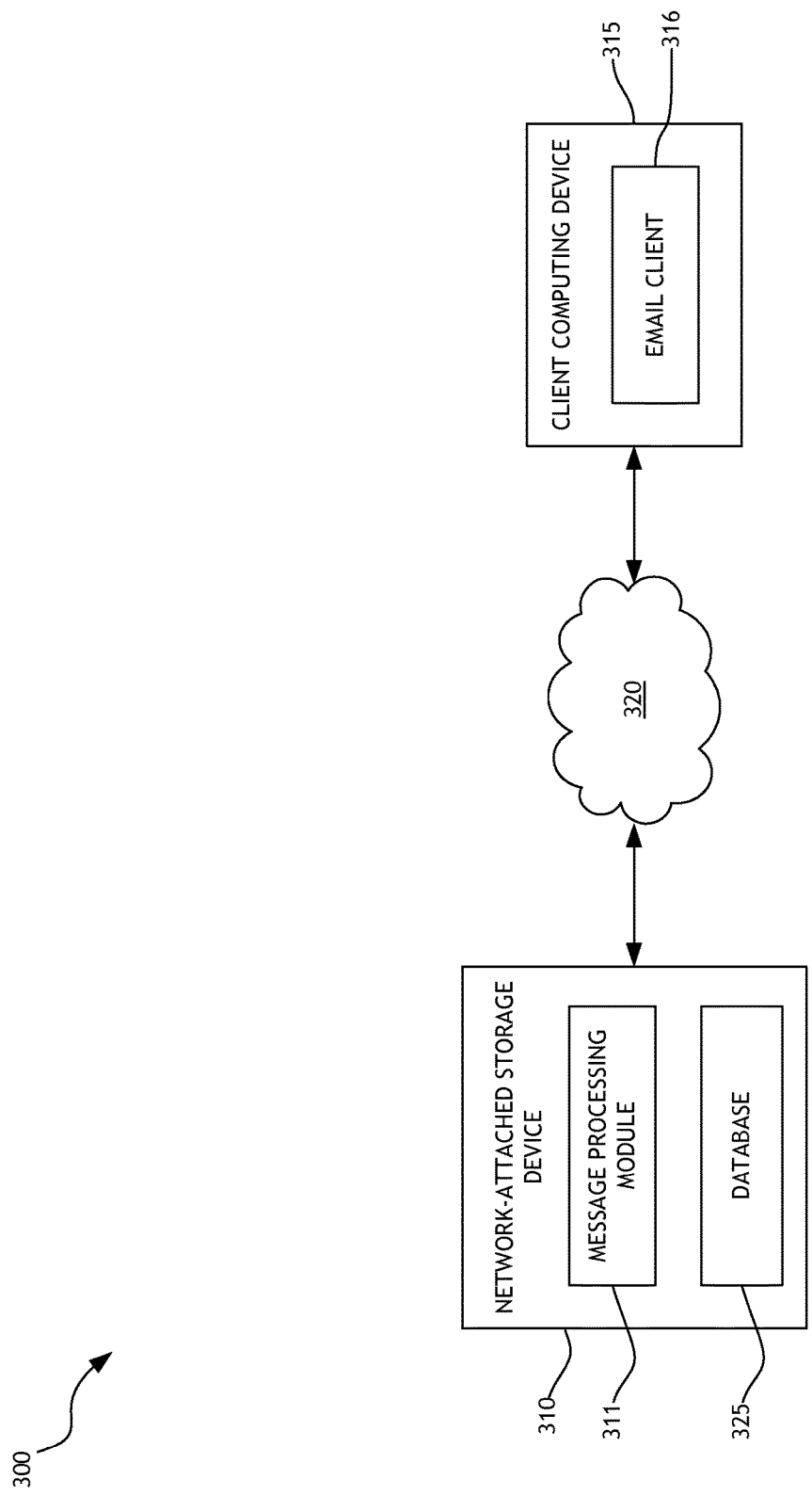
FIG. 3 is a diagram of a networked data storage system according to an embodiment.

FIG. 3 is a diagram of a networked data storage system according to a further embodiment. The networked data storage system 300 includes a client computing device 315, a NAS device 310, and a network 320. The client computing device 315 and NAS device 310 may be communicatively coupled to each other via the network 320. The NAS device 310 device may provide other computing devices (e.g., tablet computers, smart phones, laptop computers, desktop computers, etc.) with remote access to various types of user data stored on the NAS device 310. The NAS device 310 may also allow users to store various types of user data on the NAS device 310. The client computing device 315 includes an electronic-mail (email) client 216. The email client 316 may be an application that allows a user of the client computing device 315 to read, write, modify, access, and/or manage email messages (e.g., emails).

The NAS device 310 includes a message processing module 311. The message processing module 311 may allow users (e.g., end users, system administrators, technical support staff, etc.) to access and/or manage the NAS device 310 using email messages. The message processing module 311 may also include a mail server (not shown in FIG. 3). As discussed above, the message processing module 311 may receive a request from a user to register and/or activate the NAS device 310. The message processing module 311 may request the user to provide a NAS email address that may be associated with the NAS device 310 and may be used to identify the NAS device 310. The message processing module 311 may store data indicative of the association between the NAS email address and the NAS device 310 on the database 325. The message processing module 311 may also send a notification email message (that may include a list NAS operations) to an email address associated with the user.

In one embodiment, a user may request the NAS device 310 to perform one or more NAS operations using an email message (e.g., the user may request the NAS device 310 to store a file on the NAS device 310 or to obtain usage statistics). The message processing module 311 may determine which NAS operations are requested based on the email message (e.g., based on the subject or body/text of the email message) and may perform the one or more NAS operations. The message processing module 311 may generate and/or send a second email message with data indicative of the results to the user that requested the one or more NAS operations. In another embodiment, the message processing module 311 may determine that one or more NAS operations should be performed on a scheduled, periodic, and/or sporadic basis (e.g., periodically perform diagnostic tests or obtain usage statistics) and may send a message to the NAS device 310 to cause the NAS device 310 to perform the one or more NAS operations.

In another embodiment, the message processing module 311 may determine whether a user associated with the sender email address (e.g., the sender of the email message) has permission to request the NAS device 310 to perform the one or more NAS operations (e.g., by accessing the database 325). The message processing module 311 may send a second email message to an administrator of the NAS device 310 indicating that the user has requested the NAS device 310 to perform the NAS operation if the user does not have permission (as discussed above). The message processing module 311 may perform NAS operation if the user has permission (as discussed above).

In one embodiment, the message processing module 311 may identify one or more NAS operations that the NAS device 310 should perform. The message processing module 311 may generate and/or send an email message to a user (e.g., an administrator) indicating the one or more NAS operations. Based on a response email message from the user, the message processing module 311 may perform the one or more NAS operations (as discussed above).

In another embodiment, the message processing module 311 may generate and/or send an email message that includes a list of one or more features that may be of interest to a user of the NAS device 310. For example, based on a query of usage statistics of the NAS device 310, the message processing module 311 may identify a feature (e.g., a backup feature that allows the user to copy or backup data stored on the NAS device 310 to another storage device or storage service) that may be of interest to the user of the NAS device 310. The message processing module 311 may generate and/or send an email message that includes the identified feature (as discussed above).

In one embodiment, the message processing module 311 may receive a message (e.g., an email message) indicating that the users should no longer be able to manage and/or access the NAS device 310 using email messages. The message processing module may disable access and/or management of the NAS device 310 using email messages (as discussed above). In another embodiment, the message processing module 206 may also allow a user to view email messages sent to and/or received by the message processing module 206 (as discussed above).

Figure 4:
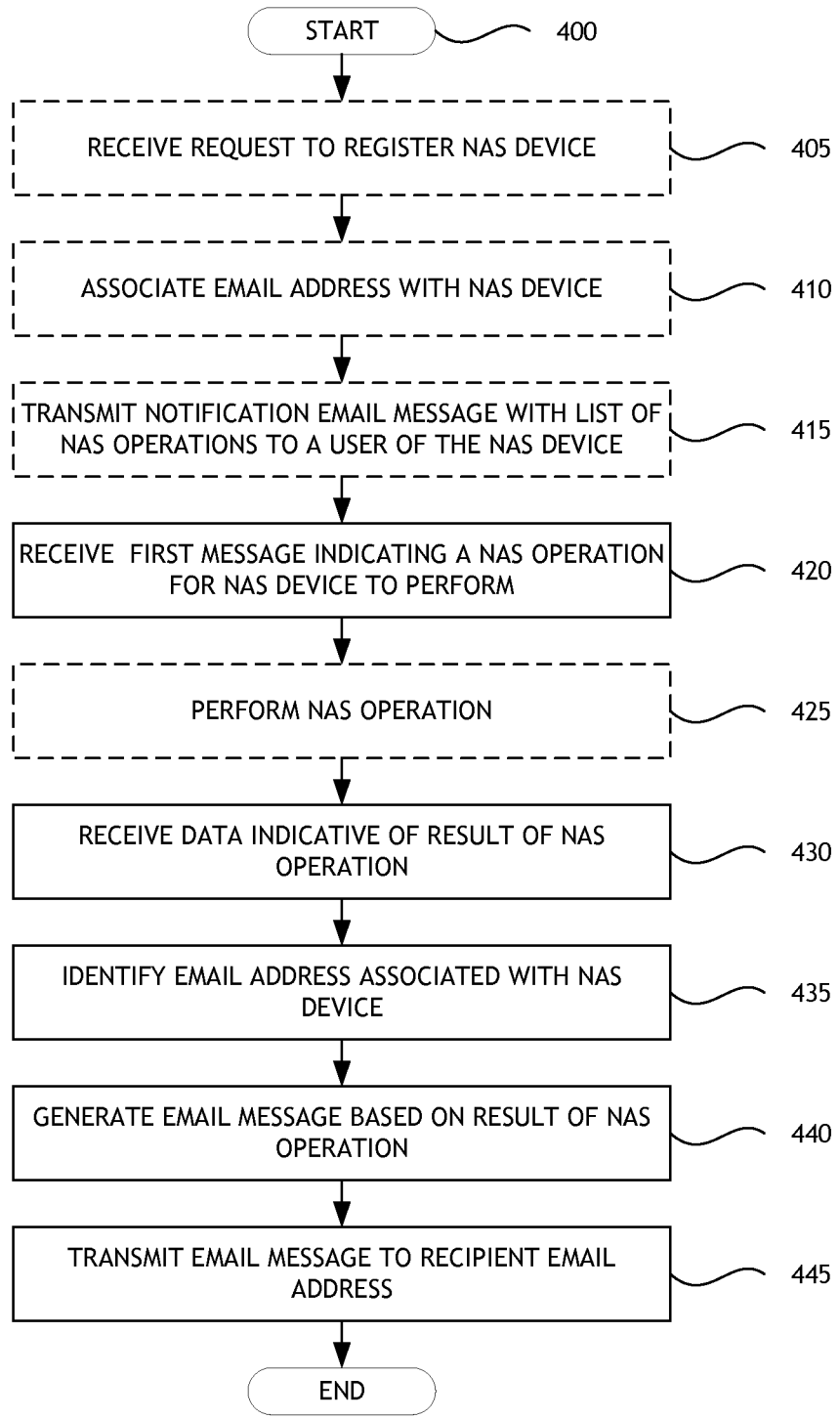
FIG. 4 is a flow diagram illustrating a process for managing and/or accessing data storage according to an embodiment.

FIG. 4 is a flow diagram illustrating a process 400 for managing and/or accessing data storage according to an embodiment. The process 400 may be performed by a server computing device and/or by a data storage device such as a NAS device. The process 400 may include receiving a request to register the NAS device, at block 405. For example, a message (e.g., an email message or other type of message) may be received indicating a request from a user to register the NAS device. At block 405, the process 400 may include associating an email address with the NAS device. For example, the user may provide an email address that to be associated with the NAS device (e.g., may provide a NAS email address). The process 400 may transmit an email message with a list of NAS operations that the NAS device may perform to the user, at block 415. Blocks 405, 410, and 415 may be optional for the process 400. For example, blocks 405, 410, and 415 may not be performed if a NAS device has already been registered.

At block 420, the process 400 includes receiving a first message indicating a NAS operation for the NAS device to perform. For example, an email message may be received from a user or a message from a server computing device may be received. The process 400 includes performing the NAS operation at block 425 (e.g., storing a file, obtaining usage statistics, performing a diagnostic test, etc.). In one embodiment, block 425 may be optional. For example, when the process 400 is performed by a server computing device, block 425 may not be performed. At block 430, the process 400 includes receiving data indicative of the result of the NAS operation (e.g., data indicating that a file was stored, data indicating the usage statistics, etc.). The process 400 includes identifying an email address associated with the NAS device (e.g., a NAS email address) at block 435. For example, a database may be accessed to determine the NAS email address that is associated with the NAS device. At block 440, the process 400 includes generating an email message based on the result of the NAS operation. For example, the email message may include the result of the NAS operation in the subject and/or body of the email message. The email message may also include the NAS email address as the sender email address. The process 400 includes transmitting (e.g., sending) the email message to an email address of a user of NAS device (e.g., an administrator or some other user), at block 445. After block 445, the process 400 ends.

Figure 5:
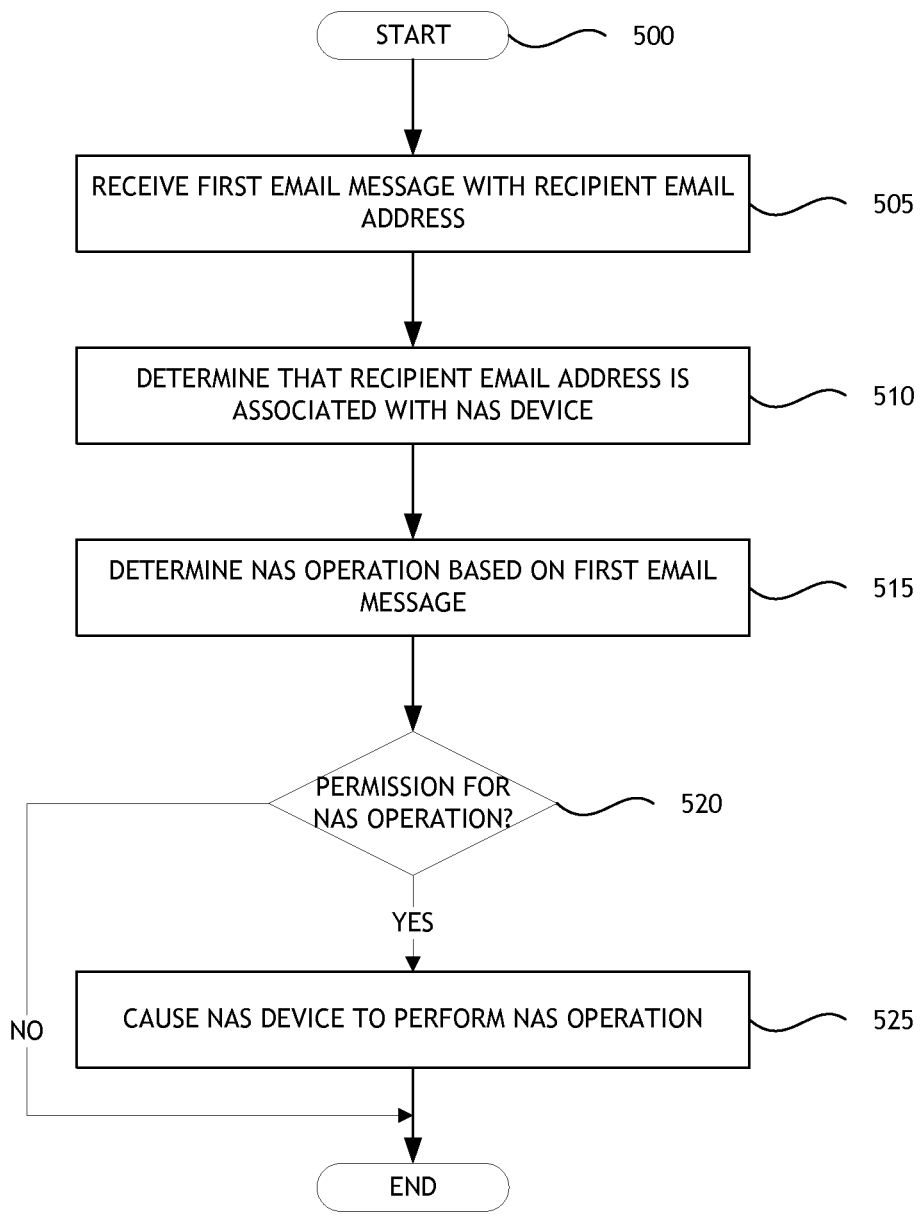
FIG. 5 is a flow diagram illustrating a process for managing and/or accessing data storage according to an embodiment.

FIG. 5 is a flow diagram illustrating a process for managing data storage according to another embodiment. The process 500 may be performed by a server computing device and/or by a data storage device such as a NAS device. At block 505, the process may include receiving a first email message with a recipient email address. The process 500 includes determining that the recipient email address is an email address associated with the NAS device (e.g., a NAS email address that may be used to identify the NAS device), at block 510. For example, a database may be accessed to determine that the NAS device is associated with the NAS email address. At block 515, the process 500 includes determining a NAS operation based on the first email message. For example, the body and/or subject of the email message may be analyzed to determine whether the body and/or subject indicate a NAS operation (e.g., store a file, delete a file, move a file, obtain usage statistics, etc.).

The process 500 includes determining whether a user associated with the sender email address of the first email message has permission to request the NAS operation. For example, the database may be accessed to determine whether the user has permission to request the NAS operation. If the user does not have permission to request the NAS operation, the process 500 may end. If the user does have permission to request the NAS operation, the process 500 includes causing the NAS device to perform the NAS operation at block 525. For example, a message may be sent to the NAS device instructing the NAS device to perform the NAS operation. After block 525, the process 500 ends.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

What is claimed is:

1. A server computing device comprising:
a processor; and
a non-transitory computer-readable medium having stored thereon instructions that, when executed by the processor, cause the processor to:
receive a first communication including a request over a wide area network from a client device, the first communication associated with a user and indicating that a network-attached storage (NAS) device should perform a NAS operation, wherein the NAS device and the client device are separated over the wide area network from the server computing device;
determine whether the user has permission to perform the NAS operation;
in response to determining that the user does not have permission, send a message to an administrator to determine whether the NAS operation should be permitted prior to responding to the request from the client device; and
in response to determining that the user has permission to request the NAS operation or in response to receiving permission responsive to the message sent to the administrator:
transmit, from the server computing device to the NAS device, a command message over the wide area network to cause the NAS device to perform the NAS operation and report a status of the NAS to the server computing device;
receive data indicative of a result of the NAS operation and the status of the NAS;
identify a first electronic-mail (email) address associated with the NAS device;
identify a feature of the NAS device that may be of interest to the user based on usage statistics of the user, the feature comprising at least one of a checkpoint feature and a periodic backup feature;
generate a first email message based on the result of the NAS operation, the first email message comprising:
a sender email address comprising the first email address;
a recipient email address;
the status of the NAS; and
an option to perform the identified feature of the NAS device; and
transmit the first email message to the recipient email address.

2. The server computing device of claim 1, wherein the instructions further cause the processor to:
prior to receiving the first communication:
receive a request from the user to register the NAS device;
associate the first email address with the NAS device; and
transmit a notification email message to the user, the notification email message comprising a list of NAS operations that the NAS device may perform based on email messages to the first email address.

3. The server computing device of claim 1, wherein:
the NAS operation comprises an operation to query the status of the NAS device.

4. The server computing device of claim 1, wherein:
the NAS operation comprises an operation to query usage statistics of the NAS device;
the result comprises the usage statistics of the NAS device; and the first email message further comprises data indicative of the result.

5. The server computing device of claim 1, wherein:
the NAS operation comprises a diagnostic test of the NAS device;
the result comprises diagnostic results of the diagnostic test; and
the first email message further comprises data indicative of the diagnostic results.

6. A method of managing a storage device, the method comprising:
receiving over a wide area network, by a server computing device, a first communication including a request from a client device, the first communication associated with a user and indicating that a network-attached storage (NAS) device should perform a NAS operation, wherein the NAS device and the client device are separated over the wide area network from the server computing device;
determining whether the user has permission to perform the NAS operation;
in response to determining that the user does not have permission, sending a message to an administrator to determine whether the NAS operation should be permitted prior to responding to the request from the client device; and
in response to determining that the user has permission to request the NAS operation or in response to receiving permission responsive to the message sent to the administrator:
transmitting a command message from the server computing device to the NAS device to cause the NAS device to perform the NAS operation and report a status of the NAS to the server computing device;
receiving data indicative of a result of the NAS operation and the status of the NAS;
identifying a first electronic-mail (email) address associated with the NAS device;
identifying a feature of the NAS device that may be of interest to the user based on usage statistics of the user, the feature comprising at least one of a checkpoint feature and a periodic backup feature;
generating a first email message based on the result of the NAS operation, the first email message comprising:
a sender email address comprising the first email address;
a recipient email address;
the status of the NAS; and
an option to perform the identified feature of the NAS device; and
transmitting the first email message to the recipient email address.

7. The method of claim 6, further comprising:
prior to receiving the first communication:
receiving a request from the user to register the NAS device;
associating the first email address with the NAS device; and
transmitting a notification email message to the user, the notification email message comprising a list of NAS operations that the NAS device may perform based on email messages to the first email address.

8. The method of claim 6, wherein:
the NAS operation comprises an operation to query the status of the NAS device.

9. The method of claim 6, wherein:
the NAS operation comprises an operation to query usage statistics of the NAS device;
the result comprises the usage statistics of the NAS device; and
the first email message further comprises data indicative of the result.

10. The method of claim 6, wherein:
the NAS operation comprises a diagnostic test of the NAS device;
the result comprises diagnostic results of the diagnostic test; and
the first email message further comprises data indicative of the diagnostic results.

11. A server computing device comprising:
processing means; and
non-transitory storage means having stored thereon instructions that, when executed by the processing means, cause the processing means to:
receive, over a wide area network, a first electronic-mail (email) message including a request from a client device associated with a user, wherein the first email message comprises a recipient email address;
determine that the recipient email address is associated with a network-attached storage (NAS) device, wherein the NAS device and the client device are separated over the wide area network from the server computing device;
determine a NAS operation for the NAS device based on the first email message;
determine whether the user has permission to perform the NAS operation;
in response to determining that the user does not have permission, send a message to an administrator, prior to responding to the request from the client device, to determine whether the NAS operation should be permitted;
in response to determining that the user has permission to request the NAS operation or in response to receiving permission responsive to the message sent to the administrator:
transmit a command message from the server computing device to the NAS device over the wide area network to cause the NAS device to perform the NAS operation; and
in response to receiving a command from the administrator to disable management through email, disable management through email on the NAS device.

12. The server computing device of claim 11, wherein:
the NAS operation comprises an operation to store a file on the NAS device; and
the first email message further comprises the file.

13. The server computing device of claim 12, wherein the first email message further comprises a storage location for the file.

14. The server computing device of claim 11, wherein the NAS operation comprises an operation to backup data stored on the NAS device to a different storage device or to a data storage service.

15. A method of managing a storage device, the method comprising:
receiving over a wide area network, by a server computing device, a first electronic-mail (email) message including a request from a client device, wherein the first email message comprises a recipient email address and is associated with a user;
determining that the recipient email address is associated with a network-attached storage (NAS) device, wherein the NAS device and the client device are separate from the server computing device;

determining a NAS operation for the NAS device based on the first email message;

determining whether the user has permission to perform the NAS operation;

in response to determining that the user does not have permission, sending a message to an administrator to determine whether the NAS operation should be permitted prior to responding to the request from the client device;

in response to determining that the user has permission to request the NAS operation or in response to receiving permission responsive to the message sent to the administrator:

transmitting a command message from the server computing device to the NAS device over the wide area network to cause the NAS device to perform the NAS operation; and in response to receiving a command from the administrator to disable management through email, disabling management through email on the NAS device.

16. The method of claim 15, wherein:
the NAS operation comprises an operation to store a file on the NAS device; and
the first email message further comprises the file.

17. The method of claim 16, wherein the first email message further comprises a storage location for the file.

18. The method of claim 15, wherein the NAS operation comprises an operation to backup data stored on the NAS device to a different storage device or to a data storage service.

19. The server computing device of claim 1, wherein the processor is configured to identify the first email address associated with the NAS device by:

determining that an identifier of the NAS device is associated with the first email address.

20. The method of claim 6, wherein identifying the first email address associated with the NAS device comprises:

determining that an identifier of the NAS device is associated with the first email address.

21. The server computing device of claim 11, wherein the instructions cause the processing means to determine that the recipient email address is associated with the NAS device by:

determining that the recipient email address is associated with an identifier of the NAS device.

* * * * *